United States Patent [19]
Kilby et al.
[11] 3,711,626
[45] Jan. 16, 1973

[54] CIRCUIT BOARD

[75] Inventors: Jack S. Kilby; James H. Van Tassel, both of Dallas, Tex.
[73] Assignee: Texas Instruments Incorporated, Dallas, Tex.

[22] Filed: Sept. 29, 1969
[21] Appl. No.: 870,881

Related U.S. Application Data

[62] Division of Ser. No. 515,903, Dec. 23, 1965, abandoned.

[52] U.S. Cl..........174/68.5, 317/101 C, 317/101 CC, 339/17 E
[51] Int. Cl...............................................H05k 1/00
[58] Field of Search......174/68.5; 317/101 B, 101 C, 317/101 CC, 101 CM; 29/625, 626; 339/17, 17 C, 17 E

[56] References Cited

UNITED STATES PATENTS

| | | | |
|---|---|---|---|
| 2,066,876 | 1/1937 | Carpenter et al. | 317/101 CM |
| 3,303,267 | 2/1967 | Coutu et al. | 174/68.5 X |
| 3,353,263 | 11/1967 | Helms | 174/68.5 X |
| 3,374,306 | 3/1968 | Bradham | 174/68.5 |
| 3,431,350 | 4/1969 | Haberecht | 174/68.5 |

*Primary Examiner*—Bernard A. Gilheany
*Attorney*—Harold Levine, James O. Dixon, Andrew M. Hassell, John E. Vandigriff and Rene E. Grossman

[57] ABSTRACT

A single-sided or a double-sided circuit board is provided with mounted semiconductor devices. The metal conductors on the circuit board are interconnected by wires embedded in the board itself, thereby dispensing with the need for a multilayered circuit board.

7 Claims, 15 Drawing Figures

Jack S. Kilby,
James H. Van Tassel,
Inventors.

Attorneys.

CIRCUIT BOARD

This application is a division of application serial No. 515,903, filed Dec. 23, 1965, now abandoned by virtue of the filing of a continuation application, Serial No. 871,756, filed October 13, 1969, now Patent No. 3,688,396.

This invention relates to circuit boards particularly suitable for high-density interconnections.

Among the several objects of the invention may be noted the provision of circuit boards for high-density interconnections which reduce the number of side-to-side interconnections needed; the provision of a circuit board in which portions of the circuit are encased or embedded in the board; the provision of a method for manufacturing circuit boards which minimizes design and layout time required for developing new circuit patterns; the provision of a method for manufacturing a circuit board which is economical for short-run or prototype apparatus as well as long-run mass production apparatus; the provision of an improved method for manufacturing circuit boards in which the supporting structure is added after at least part of the circuitry has been built up as opposed to usual procedures where a circuit is built up on a prepared board or support; the provision of such a method wherein components may be attached to two sides of the board as well as one side; and the provision of a circuit board manufacturing technique which may be used for economically assembling so-called breadboard models. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 is an exploded perspective view illustrating a step in manufacturing a circuit board according to one embodiment of the invention;

Corresponding reference characters indicate corresponding parts throughout the several views of the drawings.

Figure 1:
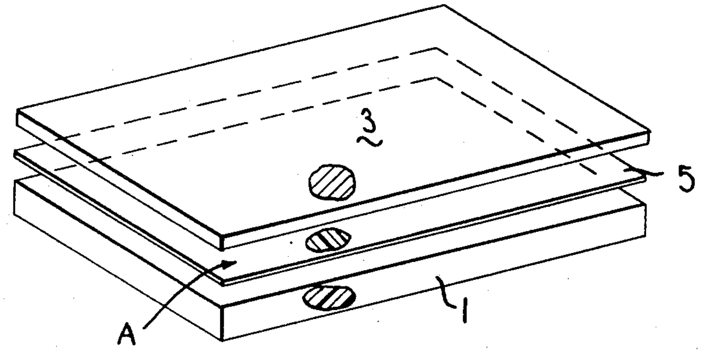

Circuit boards are available for electronic equipment requiring high-density electronic interconnections. Circuits for this equipment include semiconductor networks. These networks, also known as microminiature functional modules or integrated networks or circuits, are required to be secured to circuit boards. In theory, any number of integrated networks or circuits can be placed on a two-sided circuit board by providing an unlimited number of side-to-side conductor connections through the use of plated holes, eyelets or the like in the circuit board. However, in practice nearly all high-density electronic equipment uses multi-layer circuit boards.

Circuit boards with as many as eight to 12 layers are not unusual. Each circuit board layer requires a precision layout and a large number of holes for side-to-side connections. The layout of conductor patterns is time-consuming and has resisted computerized techniques. The art work for each side of the circuit board layer must still be developed by electronic draftsmen, which requires a considerable expenditure of money and time. Precision alignments between layers are required and, due to the large number of layer-to-layer contacts necessary, each lead must be checked for conductivity and for shorts to other leads. These and other disadvantages make the multi-layer circuit boards expensive and have been a deterent to the use of high-packing density.

Another major shortcoming of the multi-layer circuit board is the inability quickly to produce a new circuit board or make changes in the layout on a circuit board. Including the necessary art work, the preparation time for a new circuit board may be eight to twelve weeks, thus making it difficult to correct design errors finally detected. This also makes short production runs uneconomical.

Molded circuit boards manufactured according to the invention reduce design and layout time to a short enough cycle time to be feasible for short-run or prototype apparatus and permits high-density electronic interconnections to be economically made on a mass production basis. Previously the solution to the interconnection problem was directed to schemes for building a circuit on the board. By the present invention, a circuit board is built on the circuit itself.

Briefly, a molded circuit board of the invention is prepared by applying a weldable metal to a carrier and forming a pattern in the metal. Insulated wires are welded to the metal pattern to develop a circuit. Then the leads formed from the patterned metal, and the insulated wires are covered with a molded plastic which substantially encapsulates the wires and covers the metal pattern except where the metal contacts the carrier. Then the carrier is stripped from the metal, and electronic components may be welded to the exposed portions of the metal pattern to complete the electronic circuitry.

In another embodiment a double-sided board is manufactured on a hinged carrier by developing the metal pattern and welding insulated wires to the pattern in the manner set forth above. Then an electrical insulating material is placed over the circuit in one half of the carrier and that half of the carrier and the circuit on it is swung over the other half of the carrier so that the circuits on the carrier halves are separated by the insulating material. Plastic is molded between the carrier halves and the carrier removed, leaving the metal pattern exposed on the surface of the plastic. Electronic components can be welded to the exposed metal pattern.

So-called breadboards can be prepared using the process of the invention. A fixture is used which has a flexible hinge separating it into two halves or parts and there are recesses in at least one surface of each part. Integrated circuit packages (for example) are placed in the recesses. A circuit is then constructed in the manner previously described. An insulating layer is placed over the circuit and the carrier is folded along its hinge over the circuit on the other part of the carrier. The breadboard can be placed in a protective cover.

Figure 2:
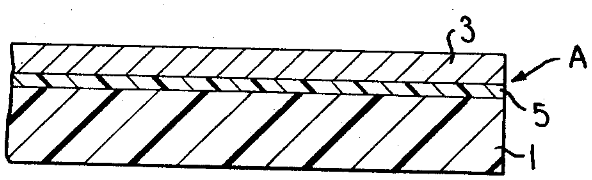
FIGS. 2–6 are enlarged sections illustrating changes that occur during manufacture of a circuit board.
Figure 3:
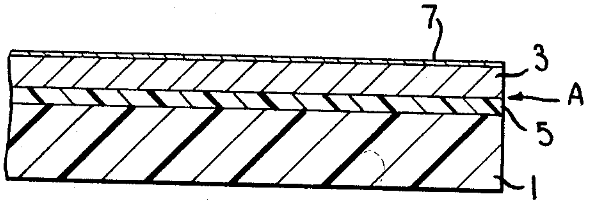

Referring now to FIGS. 1–6 of the drawings, at 1 is shown an insulating plate or carrier or base strip used for supporting a thin sheet or layer 3 of weldable metal during fabrication of a circuit board according to this invention. The metal sheet 3 may be secured to the upper surface of carrier 1 in any suitable manner, such as by cementing with suitable adhesives. An intermediate sheet 5 of Mylar plastic or other parting material may be sandwiched between carrier 1 and sheet 3 to provide a parting surface of parting area A between sheet 3 and plate 1. FIG. 2 shows three such layers cemented together. The adhesive used for securing these layers together is one which is easily removed by a solvent when the metal layer 3 is separated from carrier 1 and sheet 5, as described later. When a layer of Mylar such as 5 is provided, there is less chance that the solvent used for separating the carrier will attack the other parts. The metal layer 3 is preferably a weldable metal that resists corrosion and can be etched to form a pattern of conductive lands. Kovar or nickel foil having a thickness of about 0.002 to 0.005 inch have been found satisfactory. Materials used for the carrier 1 may vary considerably and include an inexpensive type of paper board or phenolic resin which is capable of withstanding the various operations required by the process. Thus it must be able without deforming to withstand the bonding of the layer 3 and process steps described later including etching, welding and molding. The material selected for carrier 1 will depend in part on whether the carrier is to be discarded after a single use or whether it is to be reused.

The upper surface of the metal sheet 3 is coated with a layer of a substance 7 (FIG. 3) such as a photoresist which, when exposed to light, will undergo a photochemical change. Only selected portions of the photoresist are exposed so that a pattern of lands may be developed from the metal sheet 3 in the conventional manner.

Figure 4:
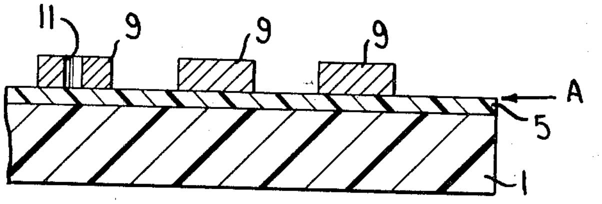

In order selectively to expose portions of the photosensitive substance, so-called art work is used which comprises a plurality of standard patterns fitted together. One standard pattern may be of a shape to expose an area corresponding to the contact strip for mating with the plugs of a standard printed circuit board. Other patterns may expose land areas suitable for welding to the leads of integrated circuit flat packs. The designer of the circuit board selects the patterns which give him the number and arrangement of contacts and lands for the components or networks to be included in the circuit. These individual patterns are then taped together to form the final art work, which is placed over the photosensitive substance 7, and the unshielded areas are then exposed to light to produce the usual photochemical reaction. Then the carrier 1, Mylar 5, metal 3 and substance 7 are exposed to an etching solution to remove the portions of layer 3 beneath the unexposed areas of substance 7. As shown in FIG. 4, this leaves a series of conductive lands or contacts, designated 9, on Mylar sheet 5. If desired, the pattern may be such that there are holes 11 in certain of the lands to provide for through holes in the resulting final circuit board.

Figure 5:
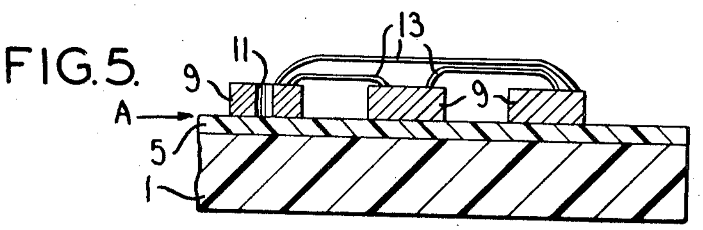

Then the desired circuit is further developed on the lands, using insulated weldable wire conductors 13 (see FIG. 5, for example). The welding of conductors 13 to the lands is in accordance with a previously prepared point-to-point wiring list based on a position code and standard integrated circuit numbering procedures arrived at during the design phase. It will be understood that in order to simplify this disclosure there has been no attempt in the drawings to illustrate any particular wiring diagram or circuit, there being a large number of possibilities in this regard.

The wire 13 used in developing the pattern must be weldable and flexible. It should have a high conductivity and is preferably covered with an insulation which can be easily removed or stripped away for baring an end of the wire to weld it to the lands 9. The wire insulation should be one which will not degrade or deteriorate during the molding process described later. Nickel wire or ribbon coated with an insulating material which is stripable when heated is suitable here. The coating may be of the type commercially available under the trade designations "Solderese" of "Nyalclad". After the wires are welded, the circuit is visually inspected for weld integrity and proper layout.

Figure 6:
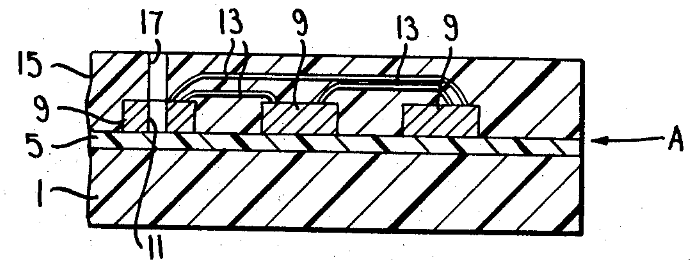

The lands 9 and wires 13 are then covered with a suitable moldable embedding plastic material such as a fiber-filled epoxy resin. The plastic when cured forms a circuit board base or matrix support for lands 9 and is generally designated 15 (FIG. 6). The plastic may be applied while the carrier 1, Mylar layer 5 and lands 9 are in a suitable mold (not shown). The plastic material of base 15 encloses the top and side faces of the lands 9, and wires 13 become completely embedded in the material 15. The material 15 may be molded to a thickness slightly greater than the desired final thickness and then belt-sanded to the desired thickness, but preferably would be molded to the desired final thickness. When closed molds are used in forming the base 15, the belt-sanding step can be eliminated. Holes 17, coaxial with holes 11, can be molded in base 15 for passing conductors or other elements through the board. Or the holes 17 may be routed or drilled subsequent to the molding step. One only of each of holes 11 and 17 is illustrated, it being understood that there may be more.

Figure 7:
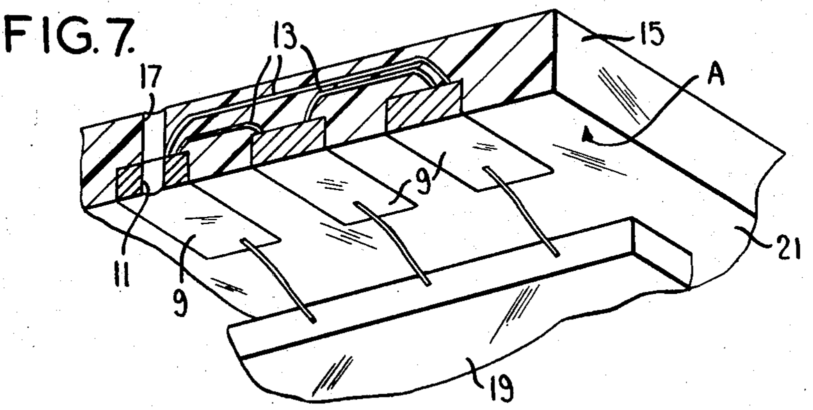
FIG. 7 is a fragmentary perspective view illustrating the completed circuit board with an electronic component connected to the board.

By using a suitable solvent, the carrier 1 and Mylar strip 5 are then separated from the plastic base 15. The solvent dissolves the cement securing plastic sheet 5 to carrier 1 and lands 9. The lands 9 are now partially encased in and held by the plastic. The resulting circuit board is illustrated in FIG. 7 of the drawings where part of a semi-conductor network or other circuit component generally designated 19 is shown welded to the exposed surface of the lands 9.

The completed circuit board has a flat surface 21 comprising the base and the exposed flush surface of lands 9. The wires or conductors 13 are fully embedded in the plastic of the base 15. The various lands 9 are wholly separate from each other as shown in FIG. 7, and they, together with the wires 13 and electronic components 19, form a circuit.

The process above described is particularly suited for manufacturing a board where the components 19 are to be mounted on a single side of the board. The method of the present invention also can be used for manufacturing circuit boards wherein components are to be mounted on both sides of the board.

Figure 8:
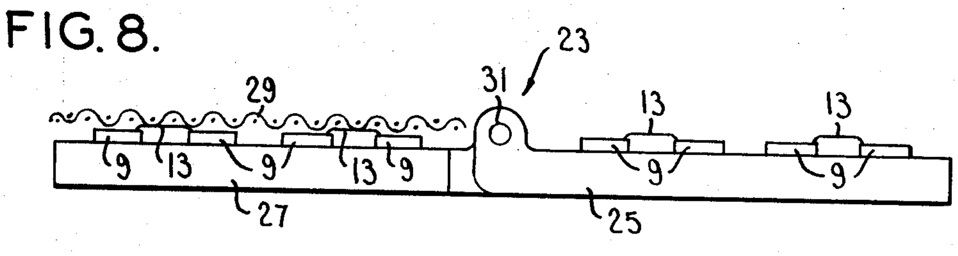
FIGS. 8 and 9 are views illustrating another method of manufacturing a circuit board according to the invention.
Figures 9, 10:
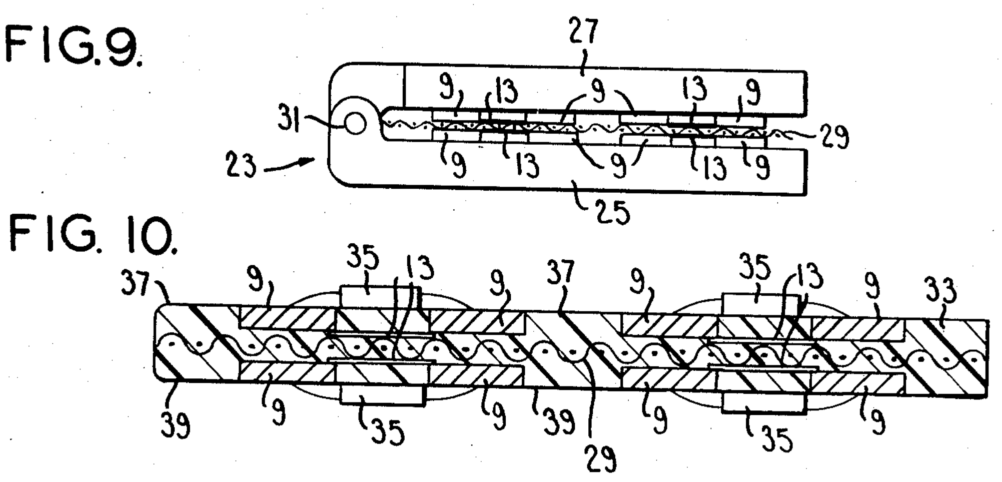
FIG. 10 is an enlarged section showing a circuit board manufactured according to the method of FIGS. 8 and 9 with electronic components connected to the board.

FIGS. 8-10 illustrate manufacture of a two-sided or double-sided circuit board. In manufacturing a double-sided board, a hinged carrier generally designated 23 is used. It comprises sections 25 and 27, each of which comprises approximately half of the carrier. Lands 9 are formed on each of the carrier halves 25 and 27 and are connected by insulated conductors 13 in the manner described in connection with FIGS. 1–5, except that in this case the Mylar layer such as 5 is omitted. Then a suitable insulating material 29 (shown as a sheet of fiber-glass fabric) is placed over the lands 9 and conductors 13 on one-half of the carrier and that half of the carrier is swung about the hinge 31 connecting the carrier parts together to place the lands 9 on one half of the carrier adjacent to the lands on the other half of the carrier. The lands on the carrier parts are separated by the insulating sheet 29. This is the position of the parts illustrated in FIG. 9 of the drawings. Then the space between the carrier halves 25, 27 is filled with a moldable plastic material to provide a base 33 for the circuit board. The material comprising base 33 flows around three sides of each of the lands 9, through the interstices of the fiber glass fabric 29 and embeds the conductors 13 in the base. Carrier 23 is then separated from the base 33 and lands 9. Then circuit components 35 (FIG. 10) may be positioned on one or both sides of the board and welded to the lands 9 to provide the desired circuitry. It will be understood that circuit interconnections can also be made through holes in the circuit board.

The circuit board shown in FIG. 10 has two substantially flat surfaces 37 and 39 generally parallel to one another and at said surfaces the metal elements or lands 9 are exposed. Other portions of the metal elements are embedded in the base. The glass cloth 29 remains in the base 33 and acts as a reinforcing and insulating member. It will be understood that glass cloth or other reinforcing material can also be provided in the plastic base 15 of the previously described embodiment of FIGS. 1 -7.

Figure 11:
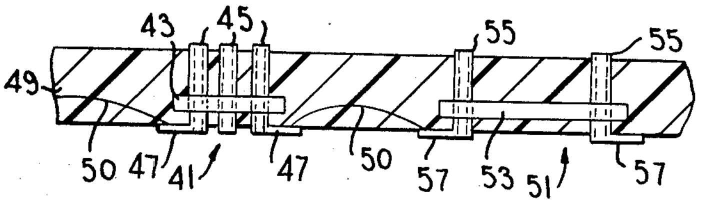
FIG. 11 is a section showing two types of preformed structures used for mounting components on a circuit board.
Figure 12:
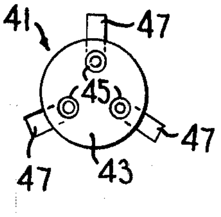
FIGS. 12 and 13 are plan views of the preformed structures per se.
Figure 13:
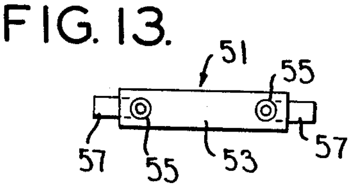

Referring now to FIGS. 11–13, conventional components for circuitry can be mounted on the circuit boards of the invention using preformed tabulated structures. One of these structures is generally designated 41 in FIGS. 11 and 12 and comprises a circular body member 43 having three spaced tubular conductors 45 extending through it. There are tabs or feet 47 attached to the lower ends of each of these tubular members 45 and they are glued to the carriers 1 or 23 immediately after the etching step which produced the series of lands 9. Insulated conductors 50 can be welded to tabs 47 prior to molding the base so that they are embedded in the base as shown. When the base 49 (equivalent to 15 in FIG. 7) of the circuit board is molded, the body portion 43 and the tubular members 45 are fixed in the base so that only the ends of the tubular portions 45 and the tabs 47 are exposed at the surface of the plastic base. The leads of conventional components can then be welded to the tubular portions 45 and the feet 47 to effect desired circuit connections.

Another preformed tabulated structure is generally designated 51 in FIGS. 11 and 13. It comprises a flat rectangular body portion 53 which is embedded in the base 49. A pair of conductive tubular members 55 project through the center portion. Tubular numbers 55 are molded in base 49 and extend entirely through the base. The lower end of the tubular members 55 have projecting tabs or feet 57 which are cemented to the carrier during manufacture of the circuit board immediately after the lands 9 are formed. The tabbed structure 51 (like the structure 41) eliminates the need for drilling operations to provide through-holes for connecting electronic components to the circuit.

Figure 14:
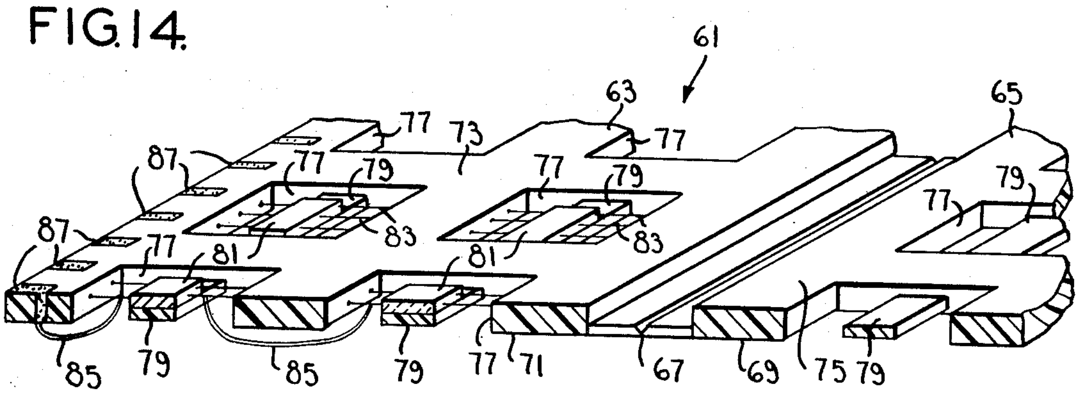
FIG. 14 is an enlarged fragmentary perspective illustrating a manner of fabricating a breadboard fixture according to the invention.
Figure 15:
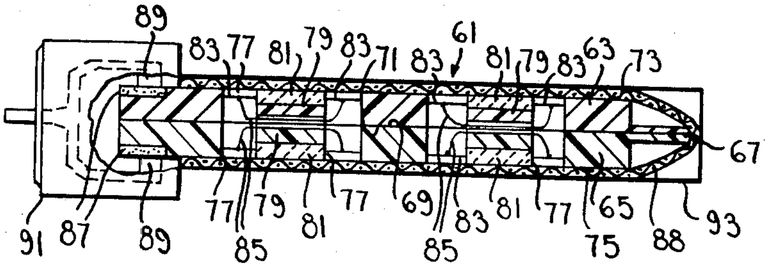
FIG. 15 is a view showing the FIG. 14 fixture attached to a printed circuit board.

FIGS. 14 and 15 illustrate a manufacturing system incorporating concepts of the invention for making so-called breadboard or experimental model boards. A premolded insulated fixture generally designated 61 is made as above described in connection with FIGS. 1–7. Fixture 61 comprises two joined parts 63 and 65 so made that each preferably constitutes approximately one half of the fixture. The fixture halves are joined by a flexible thinly molded hinge member 67. Fixture 61 is preferably made of a plastic material which permits hinge 67 to be formed by a thin weakened line. By folding the fixture along hinge 67, the lower surfaces 69 and 71 of the fixture parts can be placed in facing relation as shown in FIG. 15. The upper surfaces 73 and 75 are then generally parallel to each other.

There are rectangular openings 77, either cut or molded, in both portions of the board or fixture which are positioned so that they are aligned when the fixture halves are folded along hinge line 67. Between each pair of adjacent holes 77 there is a molded-in land area 79 which is spaced from both the upper and lower surfaces of the fixture halves 63 and 65. Semiconductor network packages 81 are positioned on lands 79. Lands 79 are recessed a sufficient distance from surfaces 73 and 75 of the fixture so that the upper surfaces of the networks 81 are substantially flush with surfaces 73 and 75 as illustrated in FIG. 15.

The network leads 83 are located in the holes that go completely through the carrier or fixture. These holes may be drilled or formed during molding by the use of suitable removable cores. A circuit is constructed by welding insulated conductors or wires 85 to leads 83 of semiconductor networks 81 in the desired arrangement. Wires 85 are positioned along the lower surfaces 69 and 71 of the carrier halves, and when the carrier is folded to its FIG. 15 position they are received in recesses created by positioning lands 79 above the lower surfaces of the carrier.

The fixture 61 has a plurality of edge contacts 87 along the outer edges of both halves 63 and 65 of the carrier. The fixture 61 may be fabricated in the manner previously described for the circuit boards and the edge contacts can then be molded into the fixture in the same manner as lands 9. Wires 85 connect the edge contacts 87 with leads of the network 79 or with other edge contacts. The contacts 87 are arranged so that they can mate with similar contacts 89 in a conventional circuit board plug 91.

In practice, after the circuit packages 81 are secured in position with the carrier halves 63 and 65 in the FIG. 14 position, an insulating layer of glass cloth or other insulating material such as shown at 88 in FIG. 15 is placed over the upper surface of both halves of the fixture and the fixture parts and the protective layer are folded to the FIG. 15 position. The fixture then can be placed in a protective metal envelope shown diagrammatically at 93. The envelope provides mechanical protection and can also serve as a heat sink, a common case ground or an R.F. shield.

Due to the high-speed capabilities of semiconductor networks it may be desirable to provide for some type of transmission line characteristics within the molded board. This may be accomplished by the use (instead of a single conductor) of twisted or parallel pairs of insulated conductors for signal paths with one of the two wires fastened to the signal terminal and the other to ground. The two wires can be insulated and twisted or simply molded in side-by-side relation but electrically separated. Also, a thin metal foil, screen or wire mesh insulated from the circuitry and grounded may be molded into the plastic for the same purpose. Another way the desirable transmission line characteristics could be provided is to mold in a conductive material as a so-called electrical ground plane. This would be done by spraying an insulation material over appropriate lead wires and lands. A thin layer of conductive plastic or paint could then be molded over this insulation material. The board can be molded or finished as above described.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

WHAT IS CLAIMED IS:

1. A circuit board comprising:

a. a matrix of hardened material;

b. first and second plurality of metal elements respectively forming first and second metal patterns with each constituting a portion of a circuit; wherein c. each of the metal elements of said first and second metal patterns are partially embedded in said matrix; and wherein d. said first and second metal patterns have a surface respectively exposed at first and second surfaces of said matrix; and e. a first group of electrical conductors embedded in said matrix and connected to the metal elements of said first metal pattern for developing a circuit; and f. a second group of electrical conductors connected to the metal elements of said second metal pattern for developing a circuit.

2. A circuit board according to claim 1, wherein at least some of said electrical conductors are covered with insulating material and wherein at least some of the matrix is composed of conductive material to provide an electrical ground plane.

3. A circuit board according to claim 1, further comprising an insulating member embedded in the matrix between the metal elements exposed at one of the matrix surfaces and the metal elements exposed at the other of the matrix surfaces.

4. A circuit board for electrical components having a matrix of selectively connected metal elements, electrical conductors and electrical leads for selectively forming an electrical circuit, comprising in combination:

a. a group of metal elements at least partially embedded within said hardened body of material to selectively form a metal element pattern constituting a portion of said electrical circuit; wherein b. at least some of said metal elements of said metal pattern have a major surface thereof exposed along a major surface of said hardened body of material to produce a plurality of exposed metal lands selectively positioned along said major surface of said hardened body of material; and c. a group of weldable and flexible electrical conductors embedded within said hardened body of material to selectively form an electrical conductor pattern constituting a portion of said electrical circuit; wherein d. said electrical conductors of said electrical conductor pattern are selectively connected to said metal elements of said metal element pattern; and e. at least one electrical component selectively positioned upon and secured to said major surface of said hardened body of material, said electrical component being electrically spaced from said metal element pattern and said electrical conductor pattern and has a group of weldable and flexible electrical leads selectively connected to said metal lands of said metal element pattern to complete said electrical circuit.

5. The circuit board of claim 4 wherein said body of hardened material is a molded plastic material.

6. The circuit board of claim 4 and further including a plurality of selectively spaced holes extending through said body of hardened material for providing unimpeded paths between the major surfaces of said body of hardened material for selectively passing conductors or other elements therethrough.

7. The circuit board of claim 4 and further including a plurality of tubular conductors extending through and embedded in said body of hardened material for providing unimpeded paths between the major surfaces of said body of hardened material for selectively passing conductors or other elements therethrough and for selectively providing circuit connections.

* * * * *